US005901689A

United States Patent [19]
Kimura et al.

[11] Patent Number: 5,901,689
[45] Date of Patent: May 11, 1999

[54] FUEL TANK DEVICE

[75] Inventors: Yasuo Kimura; Masao Uesugi; Masafumi Kunimitsu; Kiyoshi Mori; Hirokuni Seto; Kenji Kato, all of Okazaki, Japan

[73] Assignee: Mitsubishi Jidosha Kogyo Kabushiki Kaisha, Tokyo, Japan

[21] Appl. No.: 08/786,297

[22] Filed: Jan. 22, 1997

[30] Foreign Application Priority Data

Mar. 22, 1996 [JP] Japan ................................ 8-008591

[51] Int. Cl.⁶ ............................................ F02M 25/08
[52] U.S. Cl. ................................. 123/518; 123/519
[58] Field of Search ................................ 123/516, 518, 123/519, 520; 220/746

[56] References Cited

U.S. PATENT DOCUMENTS

| | | | |
|---|---|---|---|
| 4,852,761 | 8/1989 | Turner et al. | 220/746 |
| 4,919,103 | 4/1990 | Ishiguro et al. | 123/519 |
| 5,335,638 | 8/1994 | Mukai | 123/516 |
| 5,408,977 | 4/1995 | Cotton | 123/520 |

FOREIGN PATENT DOCUMENTS

| | | |
|---|---|---|
| 64-347 | 1/1989 | Japan . |
| 534989 | 9/1993 | Japan . |

*Primary Examiner*—Thomas N. Moulis

[57] ABSTRACT

A fuel tank device has a canister suitably mounted inside a fuel tank. The fuel tank device includes a tank body in which fuel is stored, a filler tube connected at one end to the tank body for supplying the fuel into the tank body, and a canister hung and supported by the edge of an opening formed through the tank body via a support member and a sealing member, for adsorbing and storing evaporative fuel generated in the tank body. The canister is mounted entirely within the tank body and located so as not to be directly exposed to the fuel when the fuel is being supplied from the filler tube.

11 Claims, 5 Drawing Sheets

FUEL TANK DEVICE

FIELD OF THE INVENTION

The present invention relates to a fuel tank device installed in a motor vehicle, and particularly to such a fuel tank device incorporating a canister.

BACKGROUND OF THE INVENTION

In a fuel tank installed in a motor vehicle, a part of fuel evaporates and generates evaporative emissions. In recent years, such evaporative emissions are drawn as purge air into an intake system of the engine where it is effectively used as fuel, without escaping into the atmosphere. This is intended to prevent pollution and improve efficiency in the use of fuel. While the engine is stopped, such as when the fuel is being supplied to the fuel tank, however, the evaporative emissions are not immediately burnt in the engine. To temporarily store the evaporative emissions in such cases, a canister containing an adsorbent material capable of adsorbing and storing fuel components (such as hydrocarbon) is provided between the fuel tank and the intake system of the engine.

This canister, which is a component of a fuel system, is located outside the cabin or vehicle compartment, and is generally mounted in the engine room, taking account of mounting space and maintainability.

Recently, however, large-sized canisters capable of adsorbing a large amount of fuel components have been prevailing because of an increased size of the fuel tank and more stringent pollution prevention laws. With the canister thus increased in size, the engine room may not be able to provide a space large enough to accommodate the canister. Where the engine room accommodates an engine having a large displacement and equipped with many devices such as a turbocharger, in particular, the canister cannot be suitably mounted in the engine room due to considerable reduction in redundant space available for the canister.

Therefore, mounting the canister in a fuel tank where there is no constraint or limit in terms of space is considered. The fuel tank, however, has components such as a fuel filler tube and a unit gauge for measuring fuel amount attached thereto, and these components incorporated in the fuel tank restrict the mounting position of the canister. Further, the mounting position of the canister must be carefully considered in view of an actual design or layout of the fuel tank itself, rigidity and material of the fuel tank, environmental characteristics of the canister, increased size of the canister and so on.

SUMMARY OF THE INVENTION

The present invention has been developed in the light of the above situations. It is, therefore, an object of the present invention to provide a fuel tank device wherein a canister is suitably mounted in a fuel tank.

To accomplish the above object, there is provided a fuel tank device for a motor vehicle, comprising: a tank body in which fuel is stored; a filler tube having one end thereof connected to the tank body, the filler tube supplying the fuel into the tank body; and a canister hung and supported by the edge of an opening formed through the tank body via a support member and a sealing member, the canister adsorbing and storing evaporative fuel generated in the tank body, the canister being mounted entirely within the tank body and located so as not to be directly exposed to the fuel supplied from the filler tube.

In the fuel tank device constructed as described above, the canister is not directly exposed to the fuel supplied from the filler tube, and therefore does not become an obstacle when refueling. Further, the performance or fuel adsorbing capability of the canister does not vary due to influences of the temperature of the supplied fuel.

According to another aspect of the invention, there is provided a fuel tank device for an automotive vehicle, comprising: a tank body in which fuel is stored, and which has an upper wall having a raised portion which gently rises outward and forms a flat surface in the middle thereof; a filler tube having one end thereof connected to the tank body, the filler tube supplying the fuel into the tank body; a canister hung and supported by the edge of an opening formed in the flat surface via a support member and a sealing member, the canister adsorbing and storing evaporative fuel generated in the tank body; a passage having one end connected to the flat surface of the tank body and the other end connected to the canister, said passage leading the evaporative fuel to the canister; and a fuel outflow preventing valve for preventing the fuel from flowing out into the passage in response to inclination of the tank body, the canister being mounted entirely within the tank body and located at a position spaced apart from the fuel outflow preventing valve.

Since the canister is provided at the position spaced apart from the fuel outflow preventing valve as described above, the opening for the canister is not located in the vicinity of a hole that receives the fuel outflow preventing valve, thus avoiding reduction in the mechanical strength of the tank body. Further, the provision of the canister does not disturb flow of the fuel around the fuel outflow preventing valve, allowing this valve to perform its function satisfactorily.

According to a further aspect of the present invention, there is provided a fuel tank device for a motor vehicle, comprising: a tank body for storing fuel therein, the tank body having an upper wall including a first flat portion and a second flat portion; a canister hung and supported by the edge of an opening formed through the second flat portion via a support member and a sealing member, the canister adsorbing and storing evaporative fuel generated in the tank body; and fuel amount detecting means for detecting an amount of the fuel in the tank body, which includes an arm member having one end pivotally attached to the first flat portion, and a float member provided at the other end of the arm member and displaced according to the level of the upper surface of the fuel in the tank body, the canister being mounted entirely within the tank body and located at a position away from a displacement range of the float member.

In the fuel tank device constructed as described above, the canister is located at the second flat portion so as not to interfere with the float member of the fuel amount detecting means. Thus, the fuel amount in the tank body can be always accurately detected by the fuel amount detecting means without being influenced by the presence of the canister.

According to a still further aspect of the invention, there is provided a fuel tank device for a motor vehicle, comprising: a tank body for storing fuel therein, the tank body having an upper wall including a flat surface; and a canister hung and supported by the edge of an opening formed in the flat surface via a support member and a sealing member, the canister being accommodated inside the opening, and adsorbing and storing evaporative fuel generated in the tank body, the support member having a flange portion formed integrally on the outer periphery of the support member to extend upward.

With the flange portion thus formed, the support member has an increased mechanical strength, and the canister is hung and supported in the tank body with higher reliability.

DETAILED DESCRIPTION OF THE PREFERRED EMBODIMENTS

Figure 1:
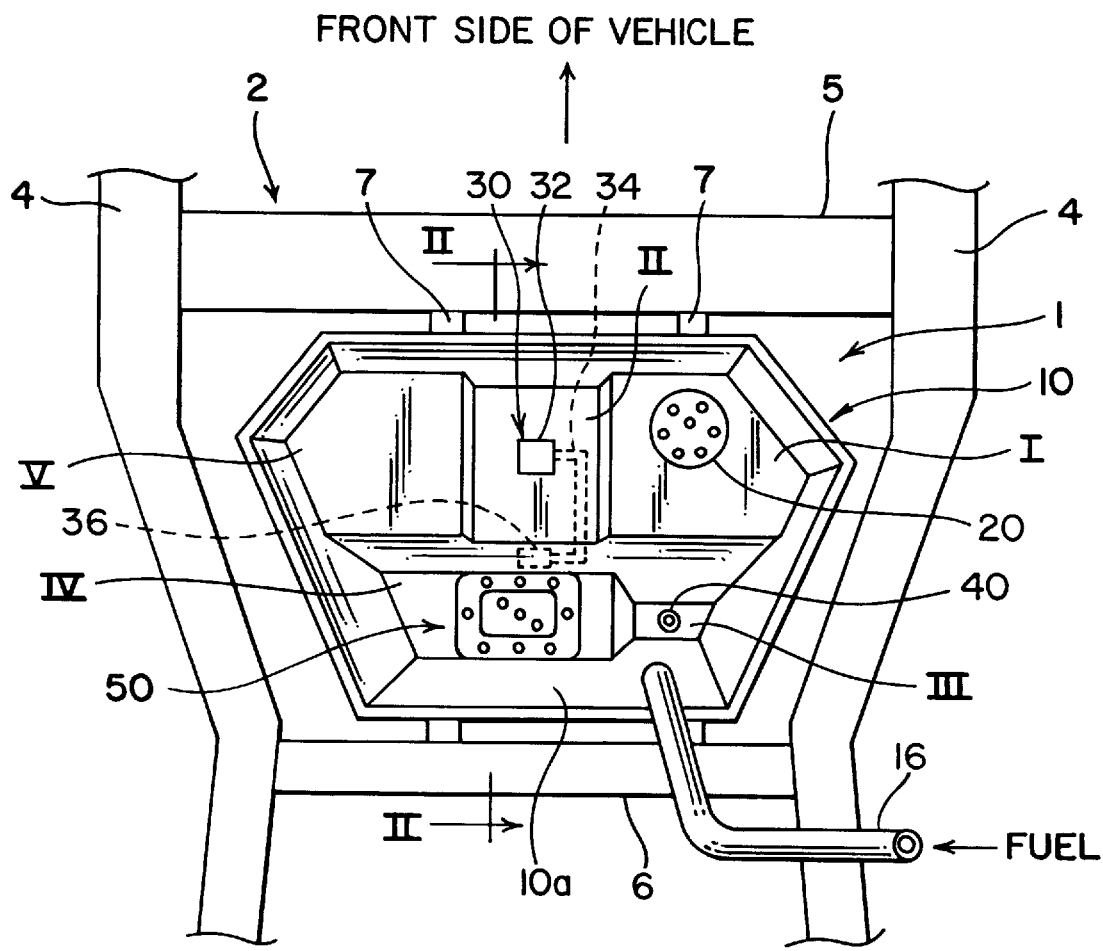
FIG. 1 is a plan view showing the first embodiment of the fuel tank device of the present invention.

Referring to the drawings, there will be described in detail presently preferred embodiments of the present invention.

Initially, the first embodiment of the present invention will be explained. FIG. 1 is a plan view showing a fuel tank device 1 of the invention installed on a motor vehicle. The fuel tank device 1 is mounted in a rear, lower part of the vehicle, namely, under the rear seat (denoted at 90 in FIG. 2). More specifically, the fuel tank device 1 is disposed between a pair of side members 4, 4, that constitute a part of a vehicle body 2 and reinforces its floor, and between a seat cross member 5 and a rear cross member 6 that extend between the side members 4, 4 and also function as reinforcing materials. A pair of steel bands 7, 7, for example, are provided to extend between the seat cross member 5 and rear cross member 6, and the fuel tank device 1 is attached to these steel bands 7, 7 and thus supported by the vehicle body 2.

Figure 2:
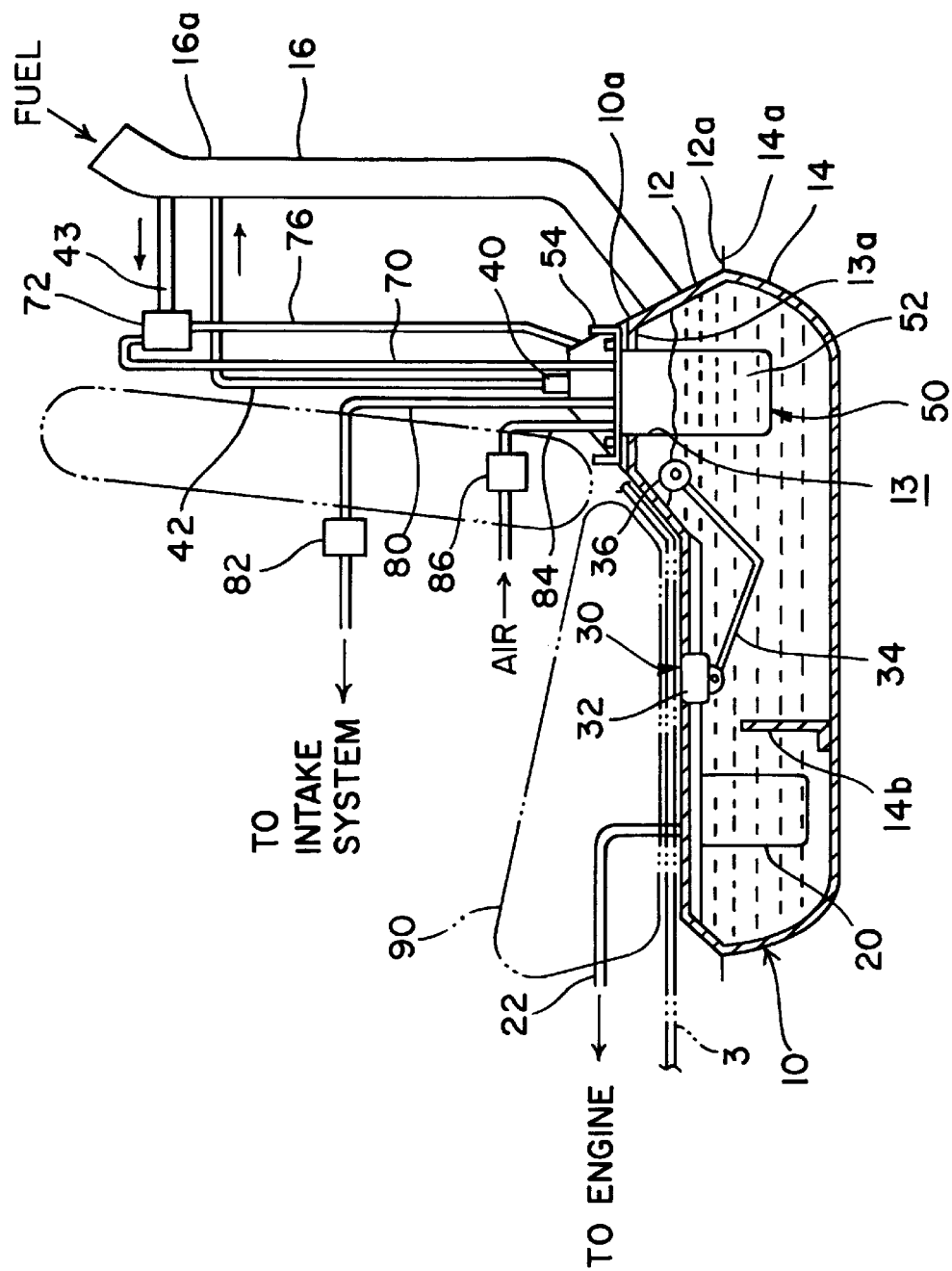
FIG. 2 is a cross sectional view of the fuel tank device, taken along line A—A of FIG. 1.

FIG. 2 is a cross section taken along the line A—A of FIG. 1. The construction of the fuel tank device 1 will be hereinafter explained referring to FIG. 1 and FIG. 2.

As shown in FIG. 1, the fuel tank device 1 principally consists of tank shell (tank body) 10, fuel filler tube 16, a fuel suction pump 20 for sucking up the fuel, unit gauge 30, and fuel cutoff valve (hereafter referred to as FCV) 40 that serves as a fuel outflow preventing valve. The fuel tank device 1 further includes a canister 50.

The tank shell 10 is a container in which the fuel is stored, and consists of upper shell 12 and lower shell 14 made of surface treated steel sheets with respective flanges 12a, 14a abutting on each other, as shown in FIG. 2. More specifically, the flanges 12a, 14a of the upper and lower shells 12, 14 are air-tightly welded to each other by seam welding, whereby the fuel can be stored within the tank without leaking therefrom. With the rear seat 90 located above the tank shell 1 through a floor panel 3, the tank shell 10 is shaped such that its rear section 10a (on the rear side of the vehicle) is swollen compared to its front section (on the front side of the vehicle), to conform to the shape of the rear seat 90. Reference numeral 14b denotes a baffle plate attached to the lower shell 12 by welding, for example. This baffle plate 14b serves to prevent the fuel in the tank shell 10 from accumulating on one side upon a change of the posture of the vehicle.

The fuel filler tube 16, which defines a passage through which the fuel is supplied into the tank shell 10, communicates at its one end with the interior of the tank shell 10, and is fluid-tightly attached to the face of the upper shell 12 that faces the rear of the vehicle. The other end of the fuel filler tube 16, though not shown in the figures, is open to the exterior of the vehicle at a side, rear part of the vehicle. To the other end of the fuel filler tube 16 is attached a fuel cap (not shown) that is detachable to allow refueling.

The fuel suction pump 20 is a feed pump adapted to supply the fuel in the tank shell 10 to the engine (not shown). This pump 20 is mounted at a vehicle front-side position of the upper shell 12 that is closer to the engine, namely, located in a region denoted at I in FIG. 1. As shown in FIG. 2, a fuel hose 22 extends from the pump 20 through the upper shell 12, toward a fuel injection system of the engine, so that the engine is supplied with the fuel. A seal is provided between the fuel hose 22 and the portion of the upper shell 12 through which the hose 22 extends, so that the fuel does not leak out of the tank shell 10.

The unit gauge (fuel amount detecting means) 30 is adapted to measure a remaining amount of the fuel stored within the tank shell 10, and consists of a gauge body 32, arm (arm member) 34 and a float (float member) 36.

To the gauge body 32 is connected one end of the arm 34 such that the arm 34 freely pivots about the gauge body 32. The arm 34 extends to the rear of the vehicle, and the float 36 is attached to the other end of the arm 34. This float 36 is adapted to float on the fuel, and moves up and down in accordance with the storage amount of the fuel, namely, changes in accordance with the level of the fuel in the tank shell 10. With the float 36 thus moved up and down, the arm 34 pivots about the gauge body 32 in accordance with the movement of the float 36, and the remaining amount of the fuel is measured based on the amount of pivotal movement of the arm 34. Described in more detail, the gauge body 32 is electrically connected to an electronic control unit (not shown) that governs a control system of the vehicle, and also electrically connected to a fuel monitor (not shown) provided in a vicinity the driver's seat. In operation, a signal representative of the amount of pivotal movement of the arm 34 is transmitted from the gauge body 32 to the electronic control unit, so that the remaining amount of the fuel is recognized or checked on the fuel monitor.

To assure high accuracy of measurement, the unit gauge 30 is provided at a position where the fuel undergoes relatively small changes in the level despite the changes in posture of the vehicle. Namely, the float 36 is located in the rear section 10a of the tank shell 10 to be freely moved up and down, and the unit gauge 30 is attached to a substantially middle portion of the upper shell 12, i.e., a flat portion (first flat portion) of a region denoted at II in FIG. 1, so that the fuel measurement is less likely to be affected by changes in the posture of the vehicle.

FCV 40 is a valve that mainly serves to release a gas in the tank shell 10 when the fuel is supplied from the fuel filler tube 16. More specifically, the FCV 40, which is constructed to be opened and closed in accordance with the posture of the vehicle, is held in an open state where the vehicle is finely running on a flat surface without oscillation, and held in a closed state where the vehicle turns over, for example. This FCV 40 is attached to the highest position of the tank shell 10, namely, to a flat portion (flat surface) of a region III (raised portion) of the rear section 10a that provides a top part of the upper shell 12, so that the gas is favorably stored in the tank shell 10 to maintain a suitable pressure head thereby to reduce influences of movements of the vehicle on the fill level of the fuel in the tank.

First vapor hose (passage) 42 which extends from the FCV 40 is connected at its distal end to a filler neck portion 16a at the upper end of the fuel filler tube 16, through a shut-off valve (not shown). To this shut-off valve is also connected a second vapor hose (passage) 43, which is in turn connected to a third vapor hose (passage) 70 and a return hose 76 through a vapor separator 72. The third vapor hose 70 is connected to a canister 50 which will be described later, while the return hose 76 is connected to the upper shell 12 of the tank shell 10. A seal is provided between the return hose 76 and the portion of the upper shell 12 to which the hose 76 is connected.

When the above-indicated fuel cap (not shown) is opened upon refueling, the shut-off valve, which is not shown, operates in association with the opening of the cap to communicate the first vapor hose 42 with the filler neck portion 16a, and disconnect the filler neck portion 16a from the second vapor hose 43 leading to the vapor separator 72. When the fuel cap is then closed upon completion of refueling, the shut-off valve operates to communicate the first vapor hose 42 with the second vapor hose 43, and disconnects the first and second vapor hoses 42, 43 from the filler neck portion 16a.

Where the FCV 40 is placed in the open state with the fuel cap closed, therefore, the gas in the tank shell 10, i.e., evaporative emissions, are fed to the canister 50, through the first vapor hose 42, second vapor hose 43 and the third vapor hose 70. At this time, a part of the evaporative emissions is separated by the vapor separator 72 into liquid fuel, which is returned to the tank shell 10 through the return hose 76 and stored therein.

The canister 50 is located in a region IV of the rear section 10a of the tank shell 10, and contains a charge of adsorbent material (such as activated charcoal). This canister 50 functions to let the adsorbent material adsorb and temporarily store fuel components of the evaporative emissions in the tank shell 10 while the engine is stopped or during refueling, and to supply the fuel components detached from the adsorbent material to the intake system of the engine during operation of the engine.

As shown in FIG. 2, the above-indicated third vapor hose 70, purge hose 80 and vent hose 84 extend from the top wall of the canister 50.

As described above, the evaporative emissions separated from the liquid component by the vapor separator 72 are supplied to the canister 50 through the third vapor hose 70. Thus, the evaporative emissions are suitably adsorbed by the adsorbent material contained in the canister 50.

The purge hose 80 defines a passage through which the fuel components of the evaporative emissions adsorbed and stored in the adsorbent material in the canister 50 is fed to the intake system of the engine, namely, a passage for sending purge air to remove the fuel components from the adsorbent material. This purge hose 80 is connected at its distal end to the intake system of the engine, and has an electromagnetic shut-off valve 82 disposed midway, as shown in FIG. 2. This shut-off valve 82 is electrically connected to the above-indicated electronic control unit, and is normally held in a closed state. During operation of the engine, however, the valve 82 is opened in response to a command from the electronic control unit. With the shut-off valve 82 opened, the fuel components of the evaporative emissions adsorbed by the adsorbent material in the canister 50 are led to the intake system of the engine through the purge hose 80 due to a vacuum of the intake system, and suitably burnt in the engine.

The vent hose 84 defines a passage through which the canister 50 communicates with the atmosphere when the above shut-off valve 82 is opened to allow the evaporative emissions to flow through the purge hose 80. This vent hose 84 has an electromagnetic shut-off valve 86 disposed midway, which is normally held in a closed state. This shut-off valve 86 is also opened in response to a command from the electronic control unit, in synchronization with the above shut-off valve 82.

Figure 3:
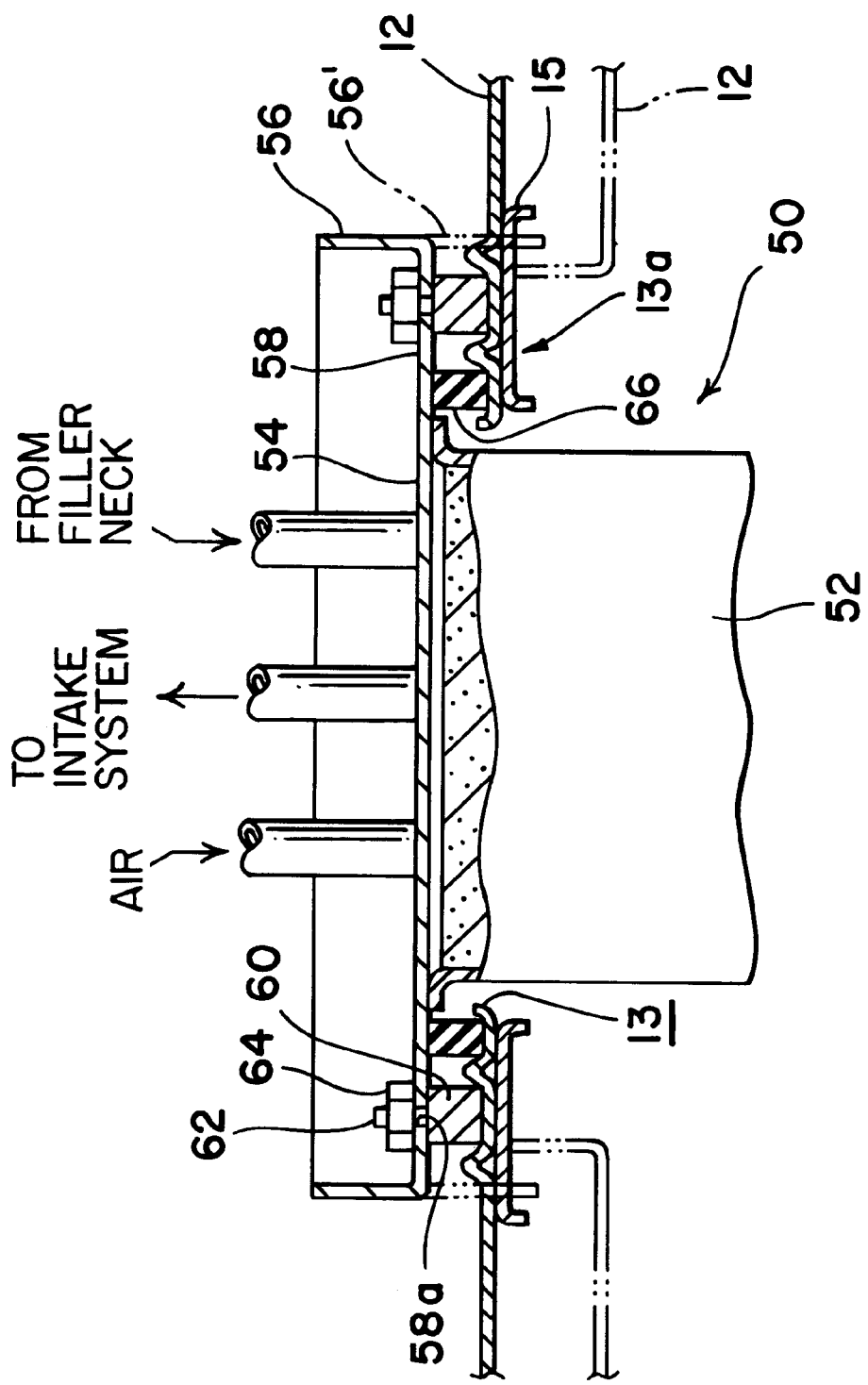
FIG. 3 is a view showing in detail a joint of a canister and a tank shell.

The canister 50 located in the region IV is mounted entirely within the tank shell 10 so as to extend downward from an opening 13 of the upper shell 12, as shown in FIG. 2. More specifically, the canister 50 is provided at its upper end with a bracket (support member) 54 formed integrally with a canister body 52, and is hung and fixed by the upper shell 12 with this bracket 54 attached to an edge portion 13a around the opening 13 of the upper shell 12. FIG. 3 is a cross sectional view showing in detail the vicinity of the upper portion of the canister 50. Referring to FIG. 3, the structure in which the canister 50 is mounted in the upper shell 12 will be hereinafter described.

As shown in FIG. 3, the canister body 52 and the bracket 54 are integrally bonded to each other by seam welding, for example. Since the canister body 52 is immersed in the fuel, the joint between the canister body 52 and bracket 54 is held in a fluid-tight state, so that the fuel does not enter the canister body 52.

The bracket 54 is formed with a horizontal flange 58 having a given width and protruding radially outwardly of the canister body 52. This horizontal flange 58 has a sufficiently large radial dimension as compared with that of the opening 13 of the upper shell 12, and is superposed on the edge portion 13a around the opening 13.

An annular tapping plate 60 is fixed to the edge portion 13a by welding or the like, and a plurality of stud bolts 62 (are provided to) protrude upward from the tapping plate 60. On the other hand, a plurality of through holes 58a are formed through the horizontal flange 58 in alignment with the stud bolts 62, and each of the stud bolts 62 is inserted through a corresponding one of these through holes 58. With nuts 64 respectively screwed on the stud bolts 62, the bracket 54 is fixed to the upper shell 12 through the tapping plate 60.

As shown in FIG. 3, an annular gasket (sealing member) 66 is interposed between a portion of the edge portion 13a closer to the opening 13 than the tapping plate 60, and the horizontal flange 58, so as to surround the opening 13. This gasket 66 has a greater height than the tapping plate 60 in its free state, and is pressed against both the horizontal flange 58 and the edge portion 13a when the bracket 54 is fixed in place by means of the nuts 64 as described above. In this arrangement, the fluid tightness is maintained between the horizontal flange 58 and the edge portion 13a, whereby the fuel and evaporative emissions in the tank shell 10 are prevented from leaking into the atmosphere.

Reference numeral 15 in FIG. 3 denotes a reinforcement that is welded to the inner face of the edge portion 13a facing the inside of the tank shell 10, to ensure a sufficiently high strength of the edge portion 13a having a small thickness.

As also shown in FIG. 3, the bracket 54 is formed with a vertical flange (flange portion) 56 continuously extending from the outer periphery of the horizontal flange 58. This vertical flange 56 is a reinforcing means for increasing the mechanical strength of the bracket 54. Since the canister body 52 is usually hung and supported only by the horizontal flange 58 of the bracket 54, the horizontal flange 58, if it has a small strength, may deform as the canister body 52 having a certain mass oscillates with the vehicle body, thereby reducing stability with which the canister 50 is held by the upper shell 12. Such deformation of the horizontal flange 58 can be prevented by providing the vertical flange 56 as described above.

While the bracket 54 of the present embodiment is bent so that the vertical flange 56 protrudes upward, i.e., away from the upper shell 12, the flange (56') may protrude downward, i.e., toward the upper shell 12, as indicated by two-dot chain line in FIG. 3. In this case, however, it is to be noted that the upper shell 12 needs to be also deformed as indicated by two-dot chain line, resulting in reduction in the volume of the tank shell 10. While the bracket 54 is bent such that the vertical flange 56 protrudes upright or vertically with respect to the upper shell 12 in FIG. 3, the flange 56 does not necessarily protrude upright, but may be inclined to form a suitable angle with respect to the horizontal flange 58, which angle is selected within a range where the bracket 54 exhibits a sufficiently high strength, while taking account of space outside the upper shell 12 to avoid interference with the shell 12.

As described above, the canister 50 is attached to a flat portion (second flat portion) of the region IV that does not include the joint between the fuel filler tube 16 and the upper shell 12. Namely, the canister 50 is located outside the line of flow of the fuel supplied from the fuel filler tube 16. Thus, the canister 50 does not become an obstacle to refueling.

The fuel supplied at the filling station is often stored underground at a low temperature. On the other hand, the fuel adsorbing capability of the adsorbent material of the canister 50 is apt to vary with the temperature. Since the canister 50 is located outside the line of flow of the fuel supplied at the filling station, the canister 50 is prevented from being directly exposed to the fuel supplied, and a rapid change in the temperature of the canister 50 can be thus avoided, assuring high stability in the performance (fuel adsorbing capability) of the canister 50.

The region IV does not include the unit gauge 30 and FCV 40, either. Thus, the canister 50 located in this IV region does not interfere with the unit gauge 30 and FCV 40, allowing the unit gauge 30 and FCV 40 to satisfactorily perform their functions. In particular, the canister 50 is separated from the FCV 40 such that the opening 13 for the canister 50 is sufficiently spaced apart from the hole for the FCV 40, thus assuring high rigidity of the tank shell 13.

In the present embodiment, the canister 50 is mounted in the region IV in view of the shape of the tank shell 10. If there is no design constraint due to the shape of the tank, the canister 50 may be provided at a position other than the regions I to III assigned as the optimum positions for the pump 20, unit gauge 30 and FCV 40, namely, may be attached to a region denoted at V in FIG. 1 that is further spaced apart from the joint between the fuel filler tube 16 and the upper shell 12.

Figure 4:
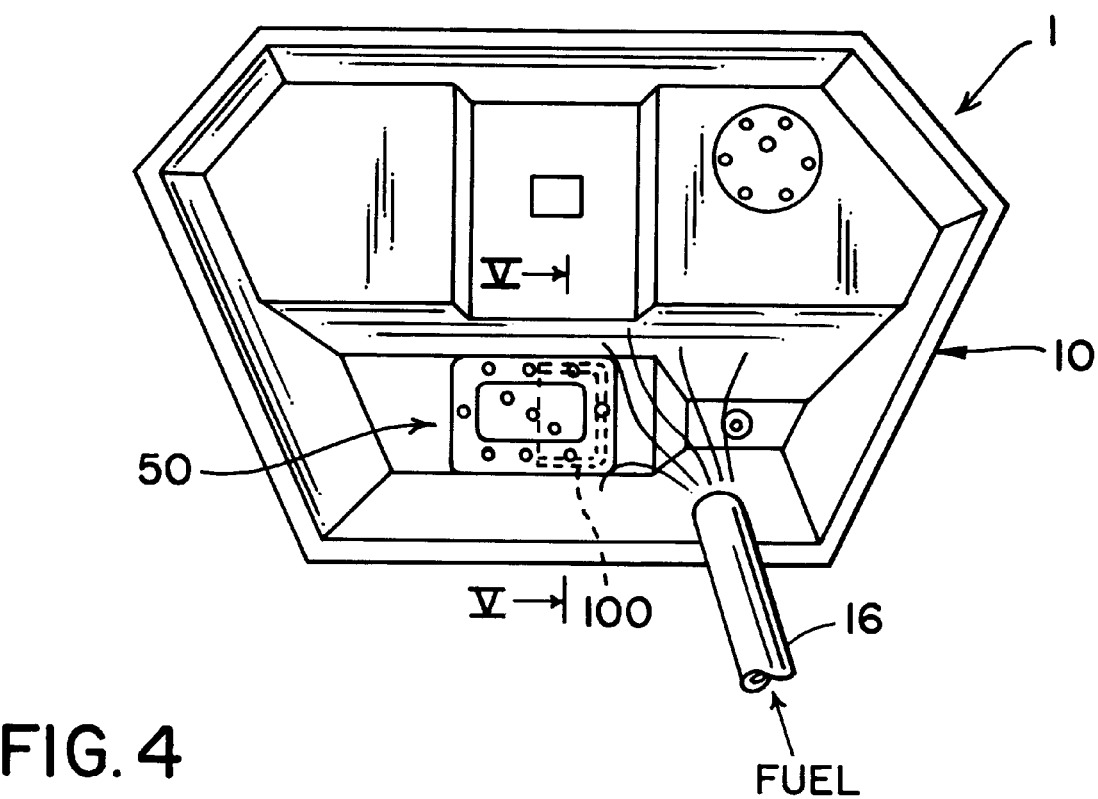
FIG. 4 is a plan view showing the fuel tank device having a shielding plate around the canister.
Figure 5:
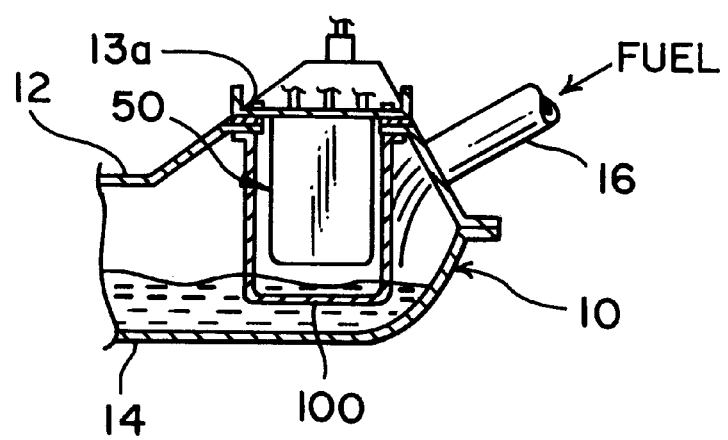
FIG. 5 is a cross sectional view taken along line B—B of FIG. 4.

FIG. 4 illustrates an example in which the canister 50 is provided with a shielding plate 100, such that about half of the canister 50 closer to the fuel filler tube 16 is surrounded by the shielding plate 100 with a given clearance between the plate 100 and the canister 50. FIG. 5 shows a cross section taken along the line B—B of FIG. 4. With the canister 50 covered with the shielding plate 100 in this manner, the canister 50 is prevented from being directly exposed to the fuel supplied from the fuel filler tube 16. This arrangement surely avoids rapid changes in the temperature of the canister 50, and the fuel adsorbing capability of the canister 50 can be maintained with increased stability. While the shielding plate 100 is welded to and hung on the above-indicated edge portion 13a of the upper shell 12 in this example, the shielding plate 100 may be provided in any other manner, e.g., may be attached to the horizontal flange 58 of the canister 50. Also, the shielding plate 100 may be a mere deflecting plate that separates the canister 50 from the joint between the fuel filler tube 16 and the upper shell 12. A baffle plate may also be used for this purpose.

As explained above, in the fuel tank device 1, the canister 50 is mounted entirely within the tank shell 10, and thus located close to a space where fuel evaporative emissions are generated, whereby an increased amount of the evaporative emissions can be collected by the canister 50. The canister 50 of the present device can be also mounted in the tank shell 10 with improved efficiency.

In the fuel tank device 1 of the invention, the canister 50 is positioned in the region that does not include the joint between the fuel filler tube 16 and the upper shell 12, so as not to lie on the line of flow of the fuel supplied from the fuel filler tube 16. In this arrangement, the canister 50 does not become an obstacle to refueling, and is also prevented from being directly exposed to the fuel being supplied. Accordingly, the canister 50 stably maintains sufficiently high capability of adsorbing fuel components even where the fuel being supplied has a relatively low temperature, and also exhibits improved durability.

The canister 50, which is provided at a position spaced apart from the unit gauge 30 and FCV 40, does not interfere with the unit gauge 30 and FCV 40, thus allowing the unit gauge 30 and FCV 40 to satisfactorily perform their functions. In particular, the canister 50 is separated from the FCV 40 such that the opening 13 for the canister 50 is sufficiently spaced apart from the hole for the FCV 40, thus avoiding reduction in the rigidity of the tank shell 10.

Figure 6:
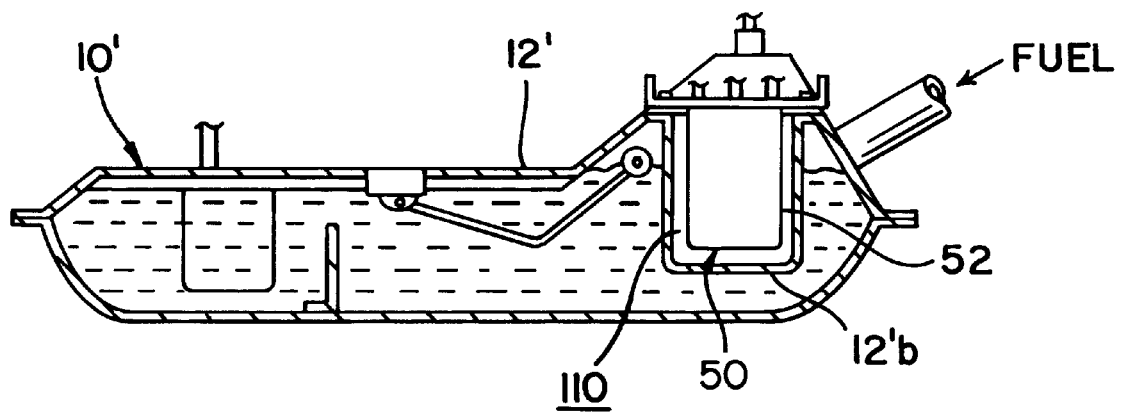
FIG. 6 is a cross sectional view showing the second embodiment of the fuel tank device of the present invention.

Referring to FIG. 6, the second embodiment of the present invention will be hereinafter described.

In FIG. 6, upper shell 12' of tank shell 10' has a recessed portion 12'b formed to a large depth by deep drawing in the region IV of FIG. 1. The canister body 52 of the canister 50 is fitted in this recessed portion 12'b. The bracket 54 is attached to the upper shell 12'. The shape of the bracket 54, joining method and others are as described above with respect to the first embodiment, and will not be explained herein. Since the canister 50 is surrounded entirely by the recessed portion 12'b in the second embodiment, there is no need to provide the sealing member 66 as shown in the first embodiment.

With the canister body 52 received in the recessed portion 12'b of the upper shell 12' as in the second embodiment, the canister 50 can totally avoid contacting with the fuel, and is thus almost free from influences of changes in the temperature of the fuel supplied. Besides, the fuel is totally prevented from entering the canister body 52 even if the fluid tightness at the joint between the canister body 52 and the bracket 54 is not completely maintained. Thus, the canister exhibits further improved durability.

Figure 7:
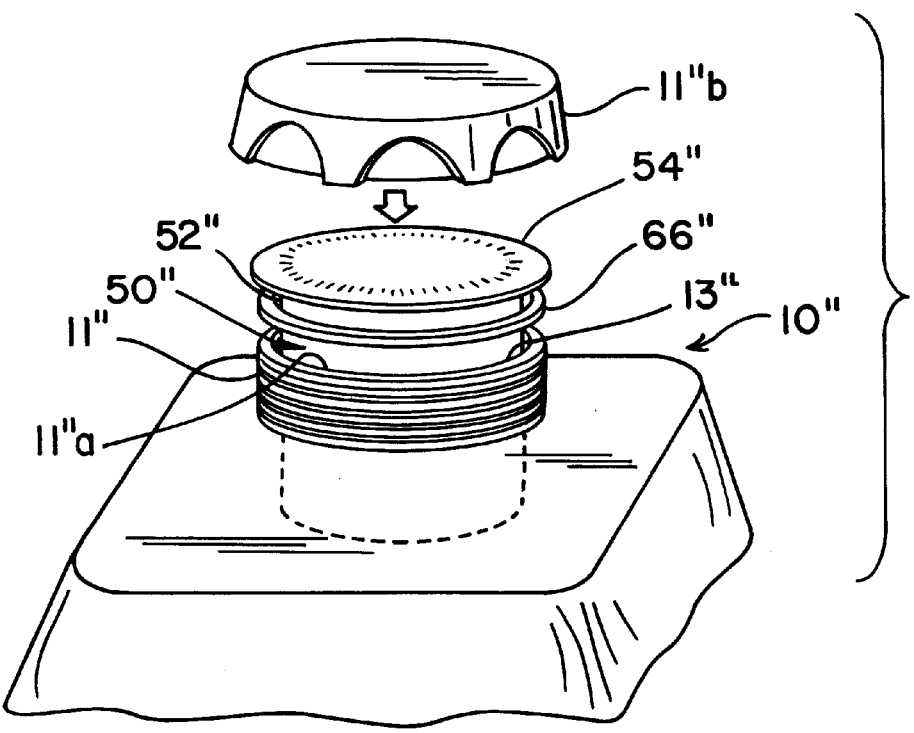
FIG. 7 is a perspective view showing a joint of a canister and a tank shell made of resin.

FIG. 7 shows a preferable manner of attaching the canister to tank shell 10" where the tank shell 10" formed of resin is employed instead of the tank shells 10, 10' formed from steel sheets as used in the above first and second embodiments.

As shown in FIG. 7, an edge portion defining opening 13" of the tank shell 10" made of resin is formed with a protruding portion (mounting portion) 11" provided with an external thread. When the canister 50" is inserted into the tank shell 10" through the opening 13", with an annular gasket 66" provided above the opening 13", bracket 54" that is air-tightly joined to the canister body 52" by seam welding or the like, abuts on the gasket 66", which in turn abuts on distal end face 11"a of the protruding portion 11". As a result, the canister 50" is hung and supported by the tank shell 10". Thereafter, when cap 11"b is screwed on the protruding portion 11", the bracket 54" is firmly pressed against the gasket 66" to provide a seal between the bracket 54" and the distal end face 11"a, and the canister 50" is stably fixed to the tank shell 10".

What is claimed is:

1. A fuel tank device for a motor vehicle, comprising:

a tank body in which fuel is stored:

a filler tube having one end thereof connected to said tank body, said filler tube supplying the fuel into said tank body; and a canister that adsorbs evaporative fuel generated in said tank body, said canister being mounted entirely within said tank body and protruding into said tank body, wherein said canister is located at a position away from a direction of fuel flow through said filler tube such that fuel flowing through said filler tube does not make direct contact with said canister upon refueling of the motor vehicle.

2. A fuel tank device according to claim 1, wherein said tank body has an opening formed through an upper wall thereof, and said canister is fixed to said upper wall of the tank body via a support member to close said opening, said support member including a horizontal flange superposed on an edge portion defining said opening and a vertical flange extending upward or downward from an outer periphery of said horizontal flange.

3. A fuel tank device according to claim 2, further comprising:

a sealing member provided between said horizontal flange and said edge portion of said opening to maintain fluid tightness between said horizontal flange and said edge portion.

4. A fuel tank device for a motor vehicle, comprising:

a tank body in which fuel is stored, said tank body including a first upper surface, a second upper surface, and a third upper surface, said first upper surface being provided higher than said second upper surface, and said third upper surface being provided lower than said second upper surface;

a filler tube having one end thereof connected to said tank body, said filler tube supplying the fuel into said tank body;

a first accessory device, used with said fuel tank device, fixed to said first upper surface;

a canister, which adsorbs evaporative fuel generated in said tank body, attached to said second upper surface, which is higher than said third upper surface, and protruding into said tank body; and a second accessory device, used with said fuel tank device, fixed to said third upper surface provided lower than said second upper surface.

5. A fuel tank device according to claim 4, wherein said first upper surface provides a top portion of said tank body, and said first accessory device includes a valve that is opened and closed according to a posture of the motor vehicle, said fuel tank device further including an evaporative fuel passage through which said evaporative fuel is led to said canister, one end of said evaporative fuel passage being connected to said tank body and the other end being connected to said canister through said valve.

6. A fuel tank device according to claim 4, wherein said third upper surface is formed at a substantially middle part of said tank body, and said accessory device includes a fuel level gauge for measuring an amount of fuel stored in said tank body.

7. A fuel tank device according to claim 6, wherein said fuel level gauge includes, a gauge body fixed to said third upper surface, an arm connected to said gauge body such that said arm freely pivots about said gauge body, and a float attached to said arm, said float floating on the fuel and being movable up and down depending upon the amount of the fuel in said tank body, wherein said arm pivots in accordance with vertical movement of said float, and said fuel level gauge measures the amount of the fuel in said tank body based on an amount of pivotal movement of said arm.

8. A fuel tank device for a motor vehicle, comprising:

a tank body in which fuel is stored;

a filler tube having one end thereof connected to said tank body, said filler tube supplying the fuel into said tank body;

a canister for adsorbing evaporative fuel generated in said tank body, said canister being mounted on said tank body; and a shielding member provided in a vicinity of said canister and forming a space therebetween, said shielding member preventing said canister from being directly exposed to the fuel flowing from said filler tube into said tank body upon refueling of said motor vehicle.

9. A fuel tank device according to claim 8, wherein said tank body has an opening formed through an upper wall thereof, and said canister is fixed to said upper wall of the tank body to close said opening.

10. A fuel tank device according to claim 8, wherein said shielding member is formed integrally with said tank body to substantially surround said canister in the entirety thereof.

11. A fuel tank device according to claim 10, wherein said shielding member protrudes within said tank body.

* * * * *

UNITED STATES PATENT AND TRADEMARK OFFICE
CERTIFICATE OF CORRECTION

PATENT NO. : 5,901,689
DATED : May 11, 1999
INVENTOR(S) : Y. Kimura et al.

It is certified that error appears in the above-identified patent and that said Letters Patent is hereby corrected as shown below:

Title page, item    "[30] Foreign Application Priority Data", please change

"Mar. 22, 1996" to -- Jan. 22, 1996 --.

Signed and Sealed this

Seventh Day of December, 1999

Attest:

Attesting Officer

Q. TODD DICKINSON

Acting Commissioner of Patents and Trademarks